United States Patent
Kim et al.

(10) Patent No.: US 10,992,011 B2
(45) Date of Patent: Apr. 27, 2021

(54) BATTERY MODULE, BATTERY PACK INCLUDING BATTERY MODULE, AND VEHICLE INCLUDING BATTERY PACK

(71) Applicant: LG CHEM, LTD., Seoul (KR)

(72) Inventors: Su-Chang Kim, Daejeon (KR); Dal-Mo Kang, Daejeon (KR); Jeong-O Mun, Daejeon (KR); Jae-Uk Ryu, Daejeon (KR); Ji-Su Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 161 days.

(21) Appl. No.: 16/337,761

(22) PCT Filed: Apr. 13, 2018

(86) PCT No.: PCT/KR2018/004353
§ 371 (c)(1),
(2) Date: Mar. 28, 2019

(87) PCT Pub. No.: WO2019/004576
PCT Pub. Date: Jan. 3, 2019

(65) Prior Publication Data
US 2019/0245169 A1   Aug. 8, 2019

(30) Foreign Application Priority Data
Jun. 27, 2017   (KR) .................. 10-2017-0081348

(51) Int. Cl.
*H01M 50/502*   (2021.01)
*B60K 6/28*     (2007.10)
*B60L 50/64*    (2019.01)
*H01M 50/287*   (2021.01)
*H01M 50/213*   (2021.01)
(Continued)

(52) U.S. Cl.
CPC ............. *H01M 50/502* (2021.01); *B60K 6/28* (2013.01); *B60L 50/64* (2019.02);
(Continued)

(58) Field of Classification Search
CPC ........ H01M 2/10; H01M 2/1077; H01M 2/20; H01M 2/202; H01M 2/206; H01M 2/1094;
(Continued)

(56) References Cited

U.S. PATENT DOCUMENTS

2009/0181288 A1* 7/2009 Sato .................... H01M 2/1077
                                                    429/57
2012/0094155 A1* 4/2012 Lim ....................... H01M 2/12
                                                     429/82
(Continued)

FOREIGN PATENT DOCUMENTS

JP   2013-225457 A   10/2013
JP   2014-53169 A    3/2014
(Continued)

OTHER PUBLICATIONS

International Search Report (PCT/ISA/210) issued in PCT/KR2018/004353, dated Aug. 3, 2018.

*Primary Examiner* — Gregg Cantelmo
(74) *Attorney, Agent, or Firm* — Birch, Stewart, Kolasch & Birch LLP

(57) ABSTRACT

A battery module includes plurality of battery cells, a cell housing configured to accommodate the plurality of battery cells and a cover housing configured to cover an upper side of the cell housing. The cover housing includes an upper cover configured to form an upper portion of the cover housing, a lower cover bolt-coupled to the upper cover and disposed at the upper side of the cell housing and a bus bar unit disposed between the lower cover and the upper cover, electrically connected to electrodes of the plurality of battery cells, and sealing-coupled to at least one of the upper cover and the lower cover.

14 Claims, 7 Drawing Sheets

(51) Int. Cl.
*H01M 50/249* (2021.01)
*H01M 50/271* (2021.01)

(52) U.S. Cl.
CPC ....... *H01M 50/213* (2021.01); *H01M 50/249* (2021.01); *H01M 50/271* (2021.01); *H01M 50/287* (2021.01); *H01M 2220/20* (2013.01)

(58) Field of Classification Search
CPC ............. H01M 2220/20; H01M 50/20; H01M 50/204; H01M 50/213; H01M 50/249; H01M 50/271; H01M 50/287; H01M 50/502; B60K 6/28; B60L 52/64; B60L 50/64

See application file for complete search history.

(56) References Cited

U.S. PATENT DOCUMENTS

| | | |
|---|---|---|
| 2013/0089763 A1 | 4/2013 | Lee |
| 2013/0252058 A1 | 9/2013 | Kim |
| 2014/0017538 A1* | 1/2014 | Nakamori ............. H01M 2/206 429/99 |
| 2014/0065455 A1 | 3/2014 | Chuang et al. |
| 2016/0093864 A1* | 3/2016 | Nakamura ............. H01M 2/206 429/121 |

FOREIGN PATENT DOCUMENTS

| | | |
|---|---|---|
| JP | 2016-72041 A | 5/2016 |
| KR | 10-2012-0040647 A | 4/2012 |
| KR | 10-1145455 B1 | 5/2012 |
| KR | 10-191425 B1 | 10/2012 |
| KR | 10-2013-0107790 A | 10/2013 |
| KR | 10-1329250 B1 | 11/2013 |
| KR | 10-2014-0015859 A | 2/2014 |
| KR | 10-2014-0130357 A | 11/2014 |
| KR | 10-2016-0054269 A | 5/2016 |
| KR | 10-2016-0132143 A | 11/2016 |
| KR | 10-2017-0040113 A | 4/2017 |

* cited by examiner

BATTERY MODULE, BATTERY PACK INCLUDING BATTERY MODULE, AND VEHICLE INCLUDING BATTERY PACK

TECHNICAL FIELD

The present disclosure relates to a battery module, a battery pack including the battery module, and a vehicle including the battery pack.

The present application claims priority to Korean Patent Application No. 10-2017-0081348 filed on Jun. 27, 2017 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs), hybrid electric vehicles (HEVs), golf carts and the like, driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.6V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components.

Since a battery pack of a multi-module structure is manufactured so that a plurality of secondary batteries are densely packed in a narrow space, it is important to easily discharge heat generated from each secondary battery. Since the charging or discharging process of the secondary battery is performed by electrochemical reaction, if the heat of the battery module generated during charging and discharging is not effectively removed, heat accumulation may occur, resulting in deterioration of the battery module and causing ignition or explosion.

Thus, a high-capacity large-capacity battery module and a battery pack including the battery module should have a cooling structure for cooling the battery cells included therein. For the cooling, a conventional battery module includes a thermal interface material or coolant in a cell housing that accommodates the battery cells. In addition, the conventional battery module is processed to be airtight around the cell housing in order to prevent foreign substances from penetrating into the cell housing or to prevent the coolant from being evaporated or discharged out.

However, in the conventional battery module, a cover housing connected to the cell housing to cover the upper side of the cell housing and having a connector exposing opening for connecting an external high current terminal has relatively low airtightness. For example, the connector exposing opening is always exposed out of the cover housing.

Thus, in the conventional battery module, a coolant or the like for cooling is relatively easily evaporated or discharged to the outside, which may deteriorate the cooling performance.

Therefore, it is required to find a way to prevent the loss due to the evaporation of the coolant by increasing the airtightness of the battery module.

DISCLOSURE

Technical Problem

Therefore, the present disclosure is directed to providing a battery module capable of enhancing the airtightness between a cell housing and a cover housing, a battery pack including the battery module, and a vehicle including the battery pack.

In addition, the present disclosure is directed to providing a battery module capable of enhancing the airtightness at an exposed portion for connecting an external high current terminal, a battery pack including the battery module, and a vehicle including the battery pack.

Moreover, the present disclosure is directed to providing a battery module capable of preventing a coolant from being evaporated or discharged out, a battery pack including the battery module, and a vehicle including the battery pack.

Technical Solution

In one aspect of the present disclosure, there is provided a battery module, comprising: a plurality of battery cells; a cell housing configured to accommodate the plurality of battery cells; and a cover housing configured to cover an upper side of the cell housing, wherein the cover housing includes: an upper cover configured to form an upper portion of the cover housing; a lower cover bolt-coupled to the upper cover and disposed at the upper side of the cell housing; and a bus bar disposed between the lower cover and the upper cover, electrically connected to electrodes of the plurality of battery cells, and sealing-coupled to at least one of the upper cover and the lower cover.

The bus bar may include: a bus bar body having an electrode connector connected to the electrodes of the plurality of battery cells and a terminal connector configured to be connected to an external high current terminal; and a bus bar sealing portion configured to surround rims of the bus bar body and the terminal connector and sealing-coupled to the upper cover.

The upper cover may include: a cover plate bolt-coupled to the lower cover, configured to cover an upper side of the bus bar and having a connector exposing opening for exposing the terminal connector; and a cover sealing portion provided at a bottom surface of the cover plate and sealing-coupled to the bus bar sealing portion.

The bus bar sealing portion and the cover sealing portion may be hook-coupled to each other.

The bus bar sealing portion and the cover sealing portion may be made of a compressible material that allows resilient deformation.

The lower cover may have a bus bar placing groove for forming an opening to connect the electrodes of the battery cells to the electrode connector and placing the bus bar body therein.

The bus bar placing groove may have a fixing portion for fixing the bus bar sealing portion.

The bolt-coupling may be performed out of the bus bar sealing portion and the cover sealing portion.

The bus bar body may be made of a flexible printed circuit board.

In another aspect of the present disclosure, there is also provided a battery pack, comprising: at least one battery module according to the above embodiments; and a pack case configured to package the at least one battery module.

In another aspect of the present disclosure, there is also provided a vehicle, comprising at least one battery pack according to the above embodiments.

Advantageous Effects

According to various embodiments as above, it is possible to provide a battery module capable of enhancing the airtightness between a cell housing and a cover housing, a battery pack including the battery module, and a vehicle including the battery pack.

In addition, according to various embodiments as above, it is possible to provide a battery module capable of enhancing the airtightness at an exposed portion for connecting an external high current terminal, a battery pack including the battery module, and a vehicle including the battery pack.

Moreover, according to various embodiments as above, it is possible to provide a battery module capable of preventing a coolant from being evaporated or discharged out, a battery pack including the battery module, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
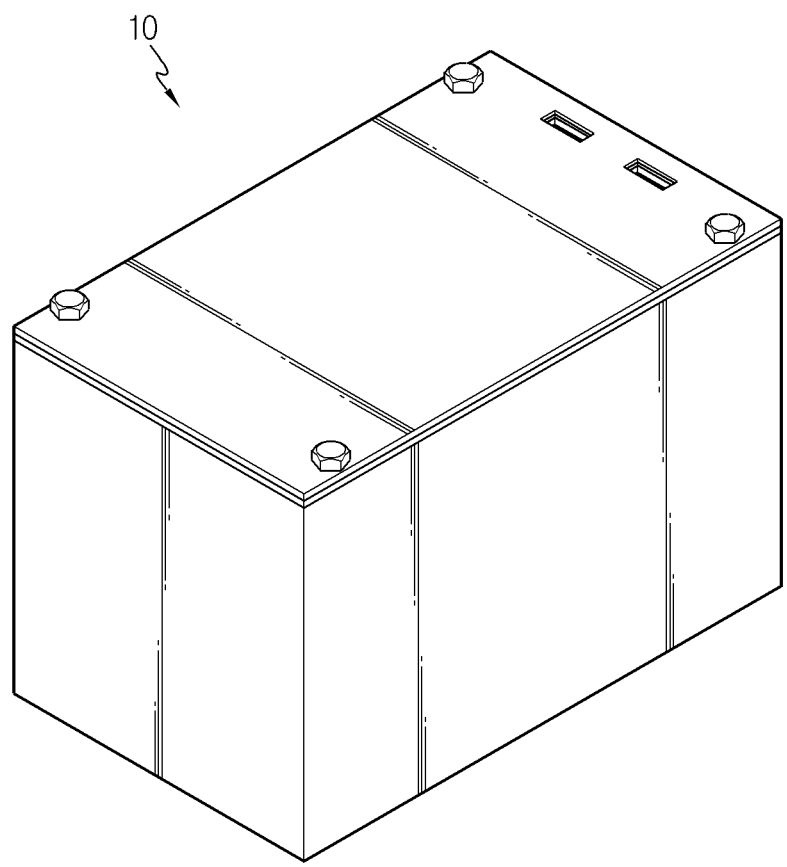
FIG. 1 is a diagram for illustrating a battery module according to an embodiment of the present disclosure.
Figure 2:
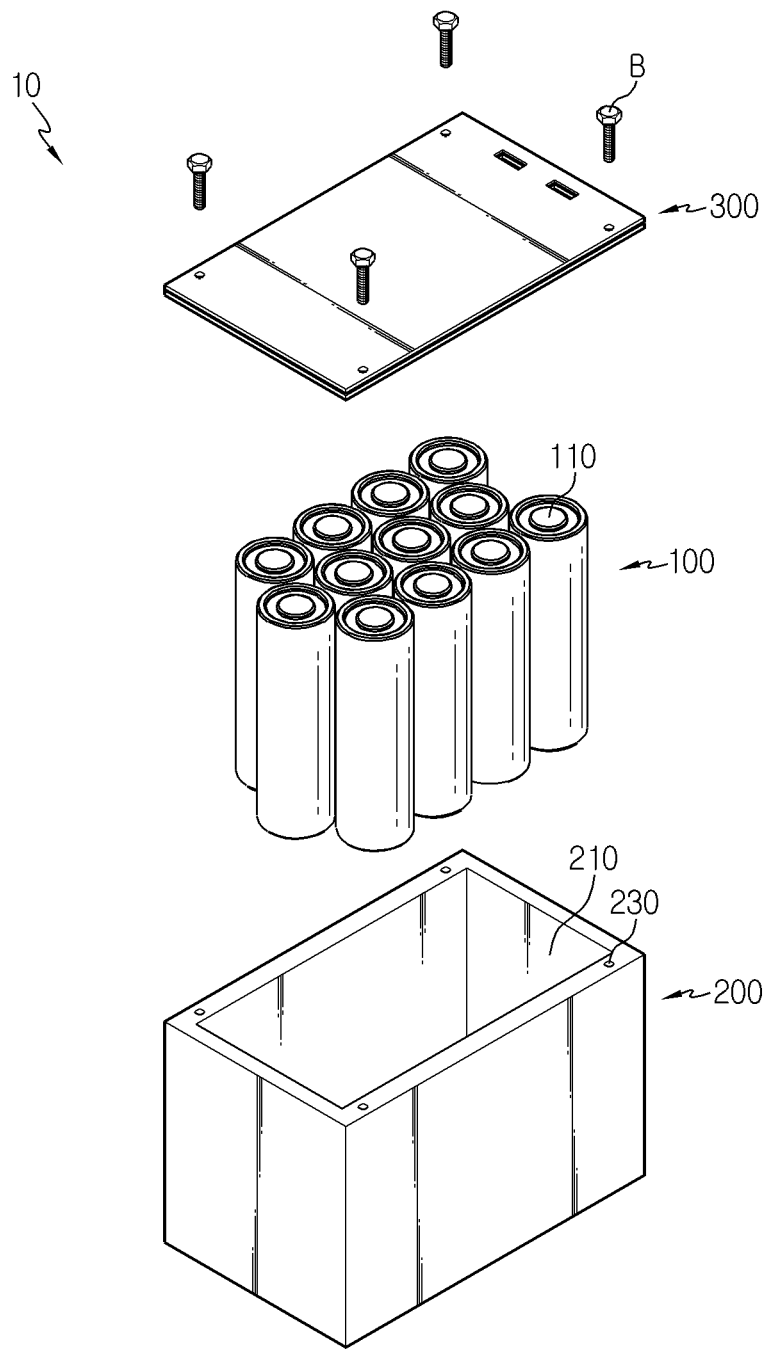
FIG. 2 is an exploded perspective view showing the battery module depicted in FIG. 1.
Figure 3:
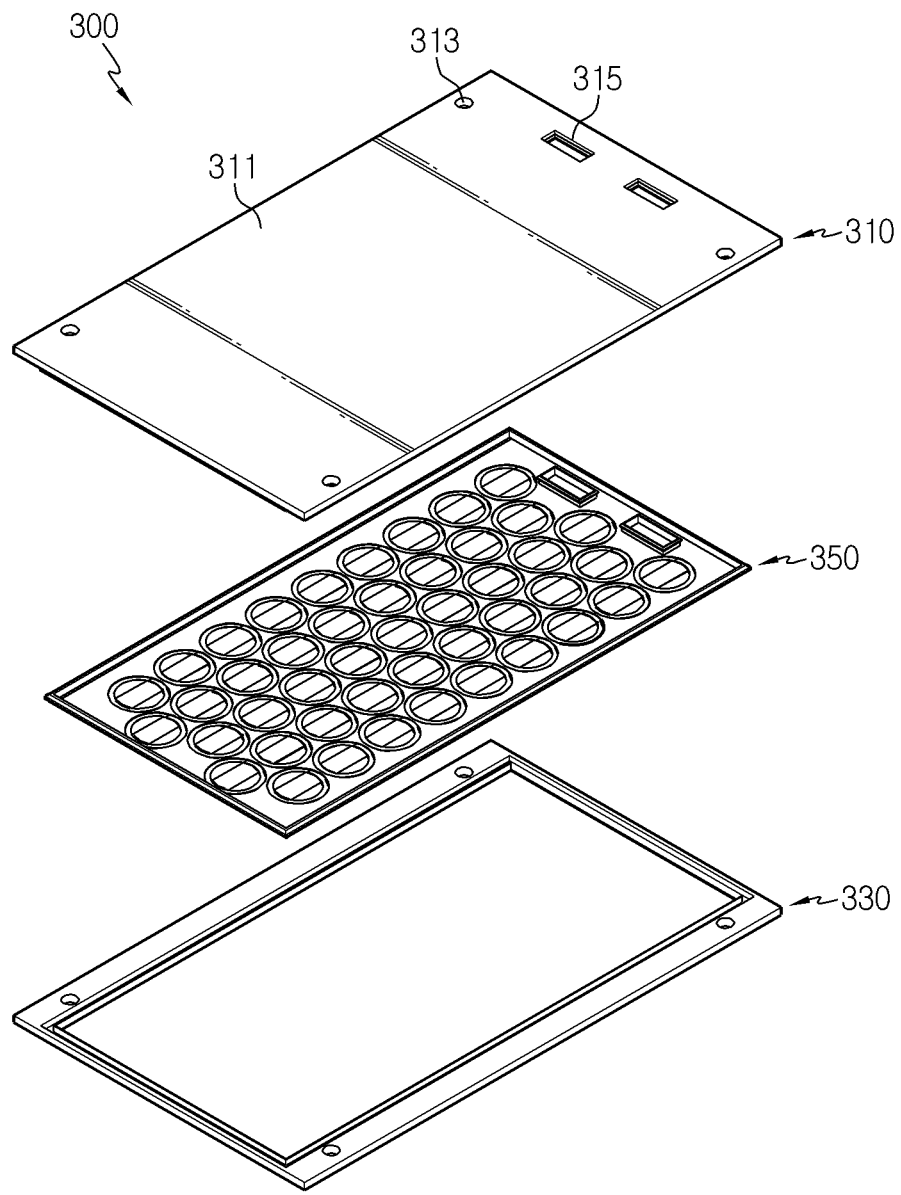
FIG. 3 is an exploded perspective view showing a cover housing of the battery module depicted in FIG. 2.
Figure 4:
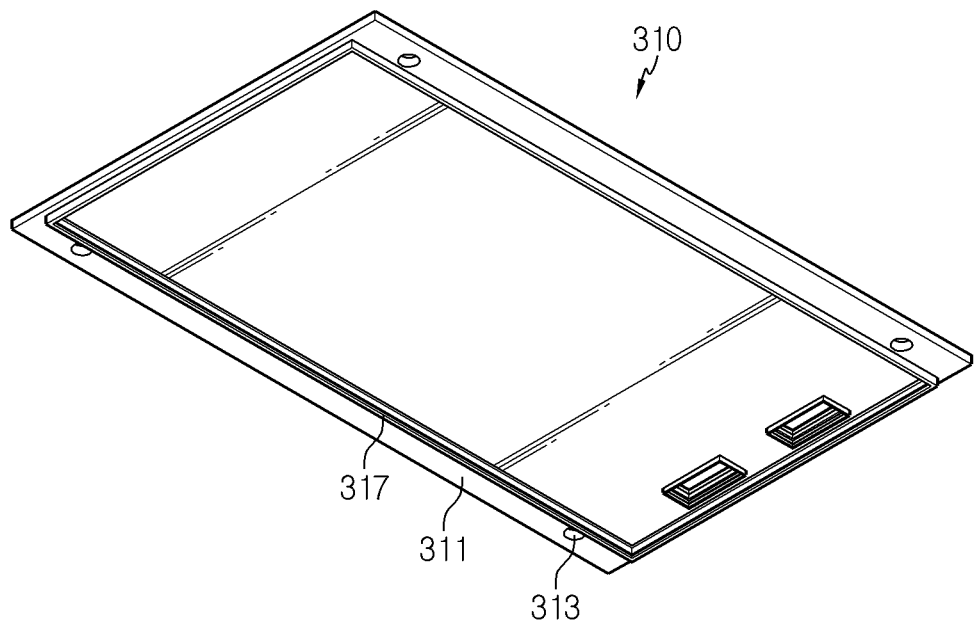
FIG. 4 is a perspective view showing a bottom surface of an upper cover of the cover housing depicted in FIG. 3.
Figure 5:
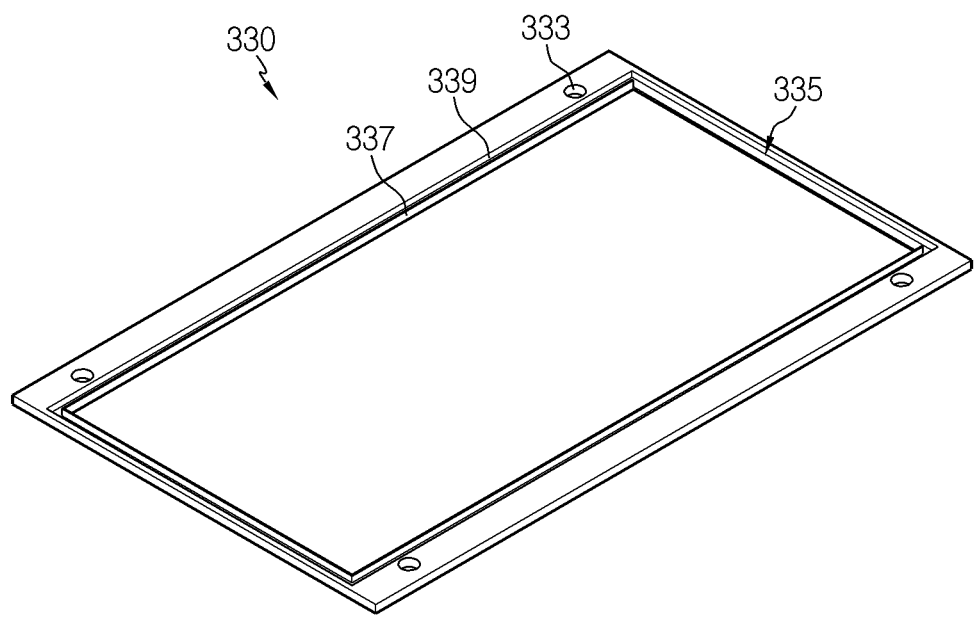
FIG. 5 is a perspective view showing a lower cover of the cover housing depicted in FIG. 3.
Figure 6:
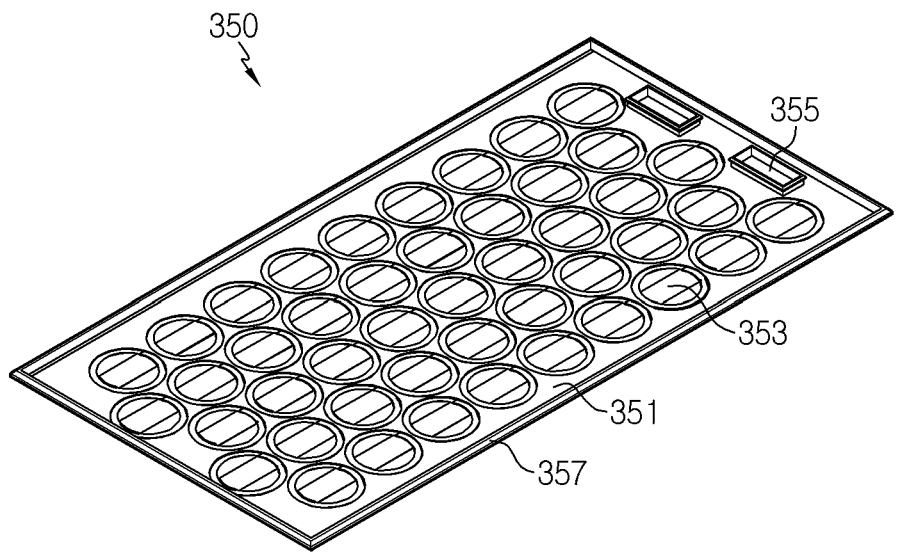
FIG. 6 is a perspective view showing a bus bar unit of the cover housing depicted in FIG. 3.

FIG. 1 is a diagram for illustrating a battery module according to an embodiment of the present disclosure, FIG. 2 is an exploded perspective view showing the battery module depicted in FIG. 1, FIG. 3 is an exploded perspective view showing a cover housing of the battery module depicted in FIG. 2, FIG. 4 is a perspective view showing a bottom surface of an upper cover of the cover housing depicted in FIG. 3, FIG. 5 is a perspective view showing a lower cover of the cover housing depicted in FIG. 3, and FIG. 6 is a perspective view showing a bus bar unit of the cover housing depicted in FIG. 3.

Referring to FIGS. 1 to 6, a battery module 10 may include a battery cell 100, a cell housing 200 and a cover housing 300.

The battery cell 100 may be provided in plural, and the plurality of battery cells 100 may be cylindrical secondary batteries. The plurality of battery cells 100 may be stacked on one another and electrically connected to each other. The plurality of battery cells 100 may have an electrode 110 for electric connection, respectively.

The cell housing 200 may accommodate the plurality of battery cells 100. The cell housing 200 may include an accommodation portion 210 and a housing bolting portion 230.

The accommodation portion 210 may have an accommodation space for accommodating the plurality of battery cells 100. The accommodation portion 210 may be filled with a coolant for cooling the plurality of battery cells 100. The coolant may be a phase change material to obtain higher cooling performance.

The housing bolting portion 230 is for coupling the cell housing 200 to the cover housing 300, explained later, and may be provided to an upper rim of the cell housing 200.

The housing bolting portion 230 may be provided in plural, and the plurality of housing bolting portions 230 may be disposed to be spaced a predetermined distance along the upper rim. Bolting members B may be fastened to the plurality of housing bolting portions 230, respectively.

The cover housing 300 may cover the upper side of the cell housing 200. The cover housing 300 may be bolt-coupled to the cell housing 200 by means of the bolting members B in order to ensure airtightness.

The cover housing 300 may include an upper cover 310, a lower cover 330 and a bus bar unit 350.

The upper cover 310 may form an upper portion of the cover housing 300. The upper cover 310 may include a cover plate 311 and a cover sealing portion 317.

The cover plate 311 covers the upper side of the bus bar unit 350, explained later, and may be bolted-coupled to the lower cover 330, explained later, and the housing bolting portion 230 of the cell housing 200.

The cover plate 311 may have an upper bolting portion 313 and a connector exposing opening 315.

The upper bolting portion 313 is for bolt-coupling between the cover housing 300 and the cell housing 200 and may be provided in plural. The bolting members B may be inserted through the plurality of upper bolting portions 313, respectively.

The connector exposing opening 315 may be formed at one side of the cover plate 311 to expose a terminal connector 355, explained later, for smooth connection between the bus bar unit 350 and an external high current terminal, explained later.

The cover sealing portion 317 is for enhancing airtightness and is provided at the bottom surface of the cover plate 311, and the cover sealing portion 317 may be sealing-coupled to a bus bar sealing portion 357, explained later.

The cover sealing portion 317 may have a shape corresponding to the bus bar sealing portion 357, explained later. Specifically, the cover sealing portion 317 may include a portion having a substantially rectangular frame shape and a portion having a shape corresponding to the connector exposing opening 315, and the cover sealing portion 317 may be coupled to the bus bar sealing portion 357, explained later, by hook-coupling or the like. Hereinafter, the cover sealing portion 317 will be described in more detail in relation to the bus bar sealing portion 357.

The lower cover 330 is disposed at the upper side of the cell housing 200 and may be bolt-coupled to the upper cover 310 and the cell housing 200 by means of the bolting members B to enhance airtightness.

The lower cover 330 may include a lower bolting portion 333 and a bus bar placing groove 335.

The lower bolting portion 333 may be provided at a position corresponding to the upper bolting portion 313 and the housing bolting portion 230 and may be provided in plural to correspond to the number of the upper bolting portion 313 and the housing bolting portion 230. The plurality of bolting members B are respectively fastened to the housing bolting portion 230 after being coupled through the upper bolting portion 313 and the lower bolting portion 333, thereby coupling the cover housing 300 and the cell housing 200 to each other. The bolt-coupling may further improve the airtightness between the cell housing 200 and the cover housing 300. Here, the bolt-coupling may be performed out of the bus bar sealing portion 357 and the cover sealing portion 317, explained later, in order to ensure the double airtight structure.

The bus bar placing groove 335 is for stably placing the bus bar body 351 of the bus bar unit 350, explained later, on the lower cover 330 and may have an opening 337 and a fixing portion 339.

The opening 337 may form an open space inside the lower cover 330 for connecting the electrodes 110 of the battery cells 100 to an electrode connector 353 of the bus bar unit 350, explained later.

The fixing portion 339 may be formed along a rim of the bus bar placing groove 335. The bus bar sealing portion 357 of the bus bar unit 350, explained later, may be placed on and fixed to the fixing portion 339.

The bus bar unit 350 is disposed between the lower cover 330 and the upper cover 310 and may be electrically connected to the electrodes 110 of the plurality of battery cells 100.

The bus bar unit 350 may be sealing-coupled to at least one of the upper cover 310 and the lower cover 330 to ensure airtightness and may include a bus bar body 351 and a bus bar sealing portion 357.

The bus bar body 351 may be made of a flexible printed circuit board. The bus bar body 351 may include an electrode connector 353 and a terminal connector 355.

The electrode connector 353 may be connected to the electrodes 110 of the plurality of battery cells 100. This connection may be made by means of welding or the like.

The terminal connector 355 may be electrically connected to an external high current terminal for connection to an external power supply of the battery module 10 or the like.

To this end, the terminal connector 355 may be exposed to the outside through the connector exposing opening 315 of the upper cover 310.

The bus bar sealing portion 357 is for securing the airtightness of the bus bar unit 350, and may surround the rims of the bus bar body 351 and the terminal connector 355 and be sealing-coupled with the cover sealing portion 317 of the upper cover 310.

The bus bar sealing portion 357 may be hook-coupled to the cover sealing portion 317. In addition to the hook-coupling, the bus bar sealing portion 357 and the cover sealing portion 317 may also be sealing-coupled to each other by means of seaming or the like.

The bus bar sealing portion 357 and the cover sealing portion 317 may be made of a compressible material that allows resilient deformation, such as an elastic rubber, an elastic pad or the like, in order to further enhance airtightness.

Hereinafter, an assembling structure for securing the airtightness of the battery module 10 according to this embodiment will be described in more detail in relation to the assembling of the cover housing 300.

Figure 7:
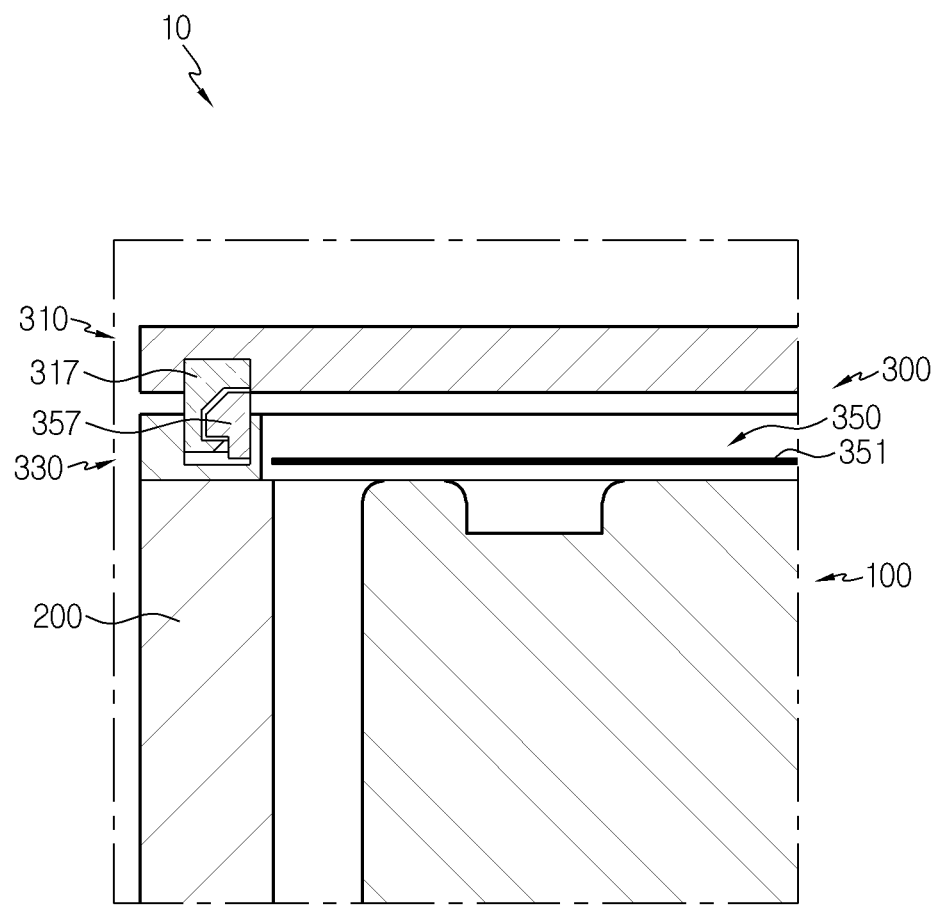
FIGS. 7 and 8 are diagrams for illustrating a process of assembling the cover housing of the battery module depicted in FIG. 2.
Figure 8:
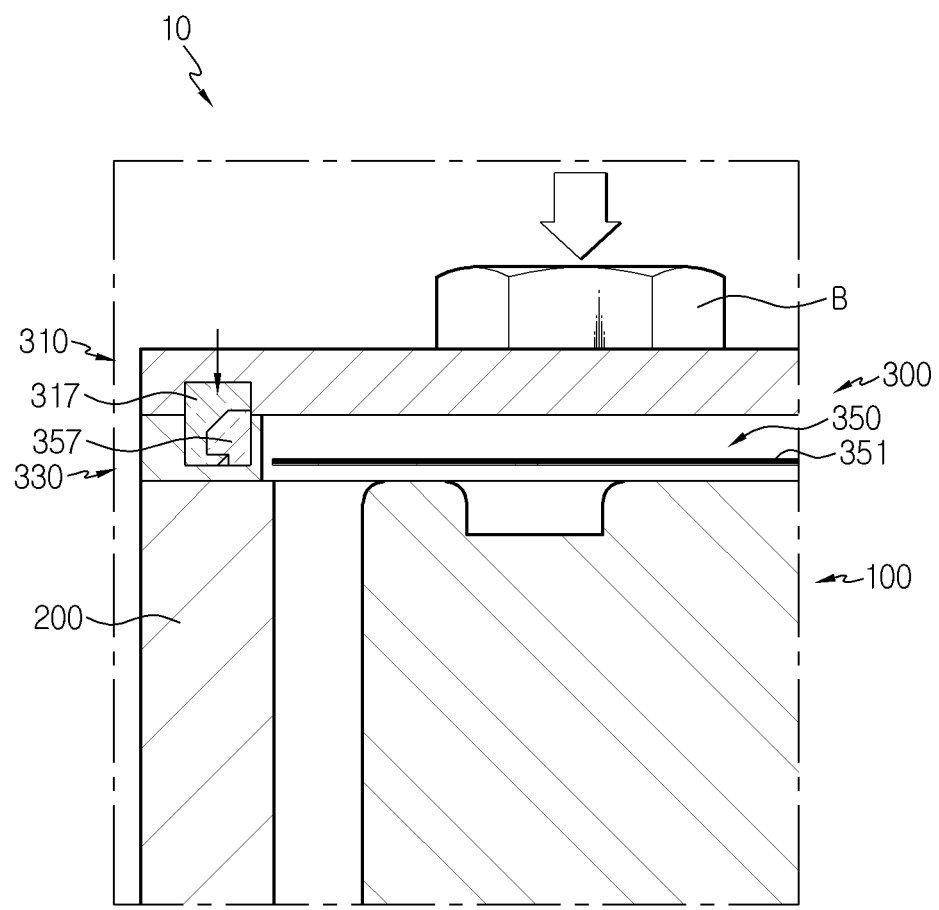

FIGS. 7 and 8 are diagrams for illustrating a process of assembling the cover housing of the battery module depicted in FIG. 2.

Referring to FIG. 7, as the cover housing 300 of the battery module 10 is assembled, when the upper cover 310 and the lower cover 317 are assembled, the cover sealing portion 317 of the upper cover 310 and the bus bar sealing portion 357 of the bus bar unit 350 may be sealing-coupled to each other by means of hooking.

The sealing-coupling may prevent foreign substances from penetrating through the connector exposing opening 315 or prevent the coolant which may be generated via the bus bar body 351 from being evaporated.

Referring to FIG. 8, after that, the bolting members B may be bolt-coupled to the upper cover 310 of the cover housing 300, the lower cover 330, and the cell housing 200.

When the bolt-coupling is performed, the upper cover 310 is pressed downward and closely adhered to the lower cover 330, and the lower cover 330 is closely adhered to the cell housing 200, thereby ensuring airtightness between the upper cover 310 and the lower cover 330, further between the cover housing 300 and the cell housing 200.

By means of the airtight structure between the upper housing 310 and the lower housing 330 and between the cell housing 200 and the cover housing 300 through the bolt-coupling, it is possible to prevent foreign substances from penetrating into the cover housing 300 and the cell housing 200 and also effectively prevent the coolant in the cell housing 200 from being evaporated or discharged out.

As a result, since the bolt-coupling is performed out of the cover sealing portion 317 and the bus bar sealing portion 357, it is possible to realize a double sealing structure along with the sealing structure of the cover sealing portion 317 and the bus bar sealing portion 357.

Meanwhile, as the upper cover 310 is pressed downward by means of the bolting member B, the cover sealing portion 317 and the bus bar sealing portion 357 engaged with each other may be resiliently deformed and more closely adhered to each other. That is, the cover sealing portion 317 and the bus bar sealing portion 357 are primarily sealing-coupled to each other by means of hooking or the like and then are closely adhered to each other by means of elastic deformation, thereby implementing a more airtight structure.

Accordingly, it is possible to prevent foreign substances from penetrating through the connector exposing opening 315 or prevent the coolant which may be generated via the bus bar body 351 from being evaporated, more reliably.

Figure 9:
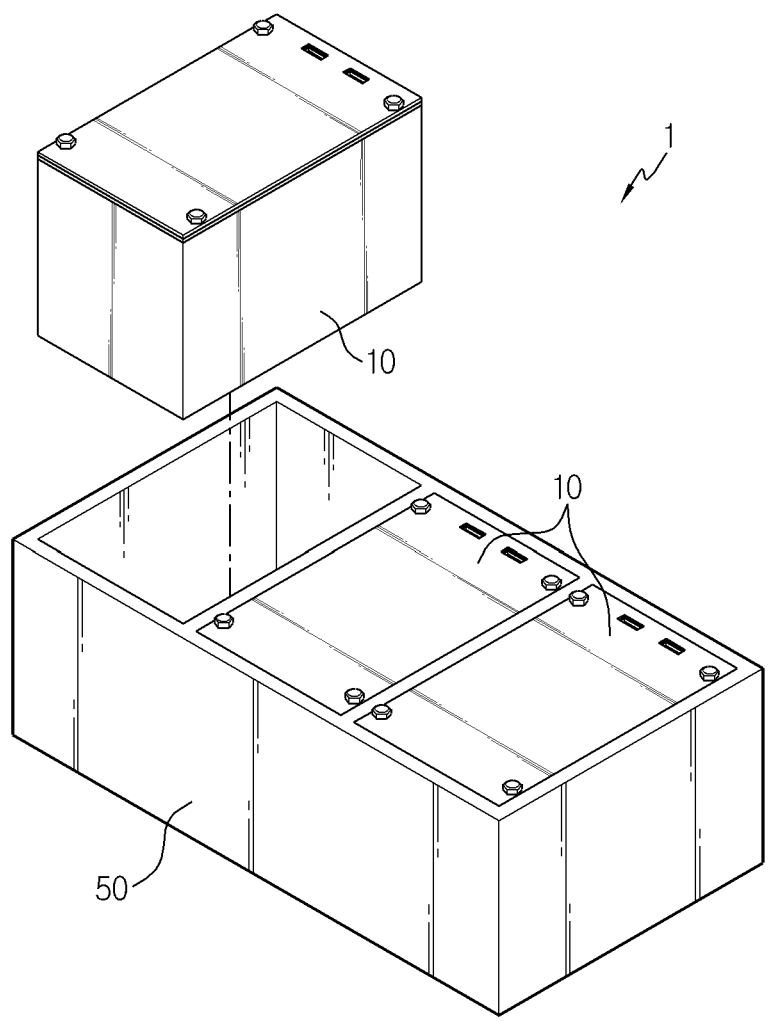
FIG. 9 is a diagram for illustrating a battery pack according to an embodiment of the present disclosure.

FIG. 9 is a diagram for illustrating a battery pack according to an embodiment of the present disclosure.

Referring to FIG. 9, a battery pack 1 may include at least one battery module 10 according to the former embodiment and a pack case 50 for packaging the at least one battery module 10.

The battery pack 1 may be provided to a vehicle as a fuel source of the vehicle. As an example, the battery pack 1 may be provided to an electric vehicle, a hybrid vehicle, and various other-type vehicles capable of using the battery pack 1 as a fuel source.

In addition, the battery pack 1 may be provided in other devices, instruments or facilities such as an energy storage system using a secondary battery, in addition to the vehicle.

As described above, the battery pack 1 of this embodiment and devices, instruments or facilities such as a vehicle, which have the battery pack 1, include the battery module 10 as described above, and thus it is possible to implement a battery pack 1 having all the advantages of the battery module 10 described above, or devices, instruments, facilities or the like such as a vehicle, which have the battery pack 1.

According to various embodiments as above, it is possible to provide a battery module 10 capable of enhancing the airtightness between the cell housing 200 and the cover housing 300, a battery pack 1 including the battery module 10, and a vehicle including the battery pack 1.

In addition, according to various embodiments as above, it is possible to provide a battery module 10 capable of enhancing the airtightness at an exposed portion for connecting an external high current terminal, a battery pack 1 including the battery module 10, and a vehicle including the battery pack 1.

Moreover, according to various embodiments as above, it is possible to provide a battery module 10 capable of preventing a coolant from being evaporated or discharged out, a battery pack 1 including the battery module 10, and a vehicle including the battery pack 1.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
a plurality of battery cells;
a cell housing configured to accommodate the plurality of battery cells, the cell housing having an upper edge; and
a cover housing configured to cover an upper side of the cell housing,
wherein the cover housing includes:
an upper cover configured to form an upper portion of the cover housing;
a lower cover coupled to the upper cover and disposed at the upper edge of the cell housing; and
a bus bar disposed between the lower cover and the upper cover, electrically connected to electrodes of the plurality of battery cells, and sealing-coupled to at least one of the upper cover and the lower cover,
wherein the lower cover is between the upper edge of the cell housing and a lower surface of the upper cover.

2. A battery pack, comprising:
at least one battery module defined in claim 1; and
a pack case configured to package the at least one battery module.

3. A vehicle, comprising:
at least one battery pack defined in claim 2.

4. The battery module according to claim 1, wherein the lower cover includes a central opening, and
wherein the bus bar is retained in the central opening of the lower cover.

5. The battery module according to claim 4, wherein the lower cover further includes a groove in an upper surface, and
wherein the upper cover includes a downwardly extending seal fitting with the groove.

6. The battery module according to claim 4, wherein the downwardly extending seal of the upper cover includes a groove in an inner surface, and
wherein the bus bar includes a sealing portion extending into the groove of the downwardly extending seal of the upper cover to retain the bus bar in the cover housing.

7. A battery module, comprising:
a plurality of battery cells;
a cell housing configured to accommodate the plurality of battery cells; and
a cover housing configured to cover an upper side of the cell housing,
wherein the cover housing includes:
an upper cover configured to form an upper portion of the cover housing;
a lower cover coupled to the upper cover and disposed at the upper side of the cell housing; and
a bus bar disposed between the lower cover and the upper cover, electrically connected to electrodes of the plurality of battery cells, and sealing-coupled to at least one of the upper cover and the lower cover, and
wherein the bus bar includes:
a bus bar body having an electrode connector connected to the electrodes of the plurality of battery cells and a terminal connector configured to be connected to an external current terminal; and
a bus bar sealing portion configured to surround rims of the bus bar body and the terminal connector and sealing-coupled to the upper cover.

8. The battery module according to claim 7, wherein the upper cover includes:
a cover plate bolt-coupled to the lower cover, configured to cover an upper side of the bus bar and having a connector exposing opening for exposing the terminal connector; and
a cover sealing portion provided at a bottom surface of the cover plate and sealing-coupled to the bus bar sealing portion.

9. The battery module according to claim 8, wherein the bus bar sealing portion and the cover sealing portion are hook-coupled to each other.

10. The battery module according to claim 8, wherein the bus bar sealing portion and the cover sealing portion are made of a compressible material that allows resilient deformation.

11. The battery module according to claim 8, wherein the lower cover has a bus bar placing groove for forming an opening to connect the electrodes of the battery cells to the electrode connector and placing the bus bar body therein.

12. The battery module according to claim 11, wherein the bus bar placing groove has a fixing portion for fixing the bus bar sealing portion.

13. The battery module according to claim 8, wherein the bolt-coupling is performed out of the bus bar sealing portion and the cover sealing portion.

14. The battery module according to claim 7, wherein the bus bar body is made of a flexible printed circuit board.

* * * * *